(12) United States Patent
Ishiwada

(10) Patent No.: US 8,406,975 B2
(45) Date of Patent: Mar. 26, 2013

(54) CONTROL APPARATUS AND CONTROL METHOD FOR VEHICLE MOUNTED WITH AUTOMATIC TRANSMISSION

(75) Inventor: Takeshi Ishiwada, Anjo (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 379 days.

(21) Appl. No.: 12/445,406

(22) PCT Filed: Aug. 23, 2007

(86) PCT No.: PCT/JP2007/066830
§ 371 (c)(1), (2), (4) Date: Apr. 13, 2009

(87) PCT Pub. No.: WO2008/056479
PCT Pub. Date: May 15, 2008

(65) Prior Publication Data
US 2009/0312927 A1 Dec. 17, 2009

(30) Foreign Application Priority Data
Nov. 7, 2006 (JP) .................................. 2006-301836

(51) Int. Cl.
*G06F 17/00* (2006.01)
*B60W 10/00* (2006.01)
(52) U.S. Cl. .......................................... 701/60; 477/76
(58) Field of Classification Search .................... 701/60, 701/51, 112, 113, 31.1; 477/94, 901, 98, 477/76
See application file for complete search history.

(56) References Cited

U.S. PATENT DOCUMENTS

| 5,928,108 | A | * | 7/1999 | Takiguchi | ..................... 477/98 |
| 2001/0041646 | A1 | | 11/2001 | Lee | |
| 2004/0204290 | A1 | * | 10/2004 | Ito | ................. 477/175 |
| 2005/0288150 | A1 | * | 12/2005 | Hitch et al. | ................. 477/98 |

FOREIGN PATENT DOCUMENTS

| JP | 11-193866 A | 7/1999 |
| JP | 11-230330 A | 8/1999 |
| JP | 2001-317622 A | 11/2001 |
| JP | 2004-116686 A | 4/2004 |
| JP | 2006-170364 A | 6/2006 |

\* cited by examiner

*Primary Examiner* — Mary Cheung
*Assistant Examiner* — Muhammad Shafi
(74) *Attorney, Agent, or Firm* — Kenyon & Kenyon LLP

(57) ABSTRACT

An ECU executes a program including the steps of: determining whether or not the conditions for execution of low-temperature neutral control: the temperature of the automatic transmission hydraulic fluid is at most a threshold value; the shift position is D or R position; the vehicle speed is zero; and the brake is ON and the vehicle is stopped, are continuously satisfied for a period of time represented by a threshold value; executing the neutral control when the conditions for execution of low-temperature neutral control are continuously satisfied for at least the period represented by the threshold value; returning from the neutral control when the conditions for execution of low-temperature neutral control are not satisfied; and restricting the throttle opening position in returning from the neutral control.

1 Claim, 5 Drawing Sheets

FIG.3

|  | C1 | C2 | B1 | B2 | B3 | F |
|---|---|---|---|---|---|---|
| 1ST | ○ | × | × | ◎ | × | △ |
| 2ND | ○ | × | ○ | × | × | × |
| 3RD | ○ | × | × | × | ○ | × |
| 4TH | ○ | ○ | × | × | × | × |
| 5TH | × | ○ | × | × | ○ | × |
| 6TH | × | ○ | ○ | × | × | × |
| R | × | × | × | ○ | ○ | × |
| N | × | × | × | × | × | × |

○ ENGAGE
× DISENGAGE
◎ ENGAGE DURING ENGINE BRAKING
△ ENGAGE ONLY DURING DRIVING

CONTROL APPARATUS AND CONTROL METHOD FOR VEHICLE MOUNTED WITH AUTOMATIC TRANSMISSION

This is a 371 national phase application of PCT/JP2007/066830 filed 23 Aug. 2007, claiming priority to Japanese Patent Application No. 2006-301836 filed 7 Nov. 2006, the contents of which are incorporated herein by reference.

TECHNICAL FIELD

The present invention relates to control of a vehicle mounted with an automatic transmission, and particularly to control under which neutral control is performed when the temperature is low.

BACKGROUND ART

An automatic transmission mounted on a vehicle is configured with a transmission mechanism connected to an engine via a torque converter for example and having a plurality of power transmission paths. The automatic transmission is configured to automatically switch the power transmission paths based on the accelerator pedal position and the vehicle speed, for example, namely to automatically shift the gear ratio (gear). Generally, the vehicle having the automatic transmission includes a shift lever operated by a driver and, based on the operation of the shift lever, the shift position is set in any position (for example, rearward drive position, neutral position, forward drive position). In the shift position (usually forward drive position) set in this manner, automatic transmission control is performed.

When the vehicle having such an automatic transmission as described above is set in the forward drive position and the vehicle is stopped, the driving force from the engine which is idling is transmitted via the torque converter to the transmission and then transmitted to wheels, resulting in a so-called creep phenomenon. While the creep phenomenon is very useful under certain conditions, specifically, useful in that the vehicle stopped on a slope can be started smoothly, the creep phenomenon is unnecessary when the vehicle should be kept stopped. In such a case, the brake of the vehicle is activated to suppress the creep force. In other words, the creep force from the engine is suppressed by the brake, resulting in the problem of accordingly deteriorated fuel economy of the engine.

In view of the above, the following proposal has been made. Namely, under the conditions: the vehicle is in the forward drive position; the brake pedal is pressed down to activate the brake; the accelerator pedal is substantially fully released; and the vehicle is stopped, the transmission is set in a neutral state which is close to the neutral while the forward drive position is kept, thereby improving the fuel economy (in the following, this operation is also referred to as "neutral control"). At this time, a certain frictional engagement element of the transmission is disengaged (to be accurate, the engagement pressure of the frictional engagement element is decreased so that the element is in a slip state under control).

Many techniques have been disclosed regarding to make determination about conditions for permission and conditions for inhibition of execution of such neutral control to execute the neutral control, inhibit the neutral control, or make a transition from the state of permission to the state of inhibition (namely return from the neutral control). For example, when the hydraulic fluid of the automatic transmission that operates a frictional engagement element of the automatic transmission has a low temperature, the hydraulic fluid has a high viscosity and thus is highly viscous. Therefore, the response of the frictional engagement element whose engagement and disengagement are controlled by the hydraulic fluid pressure deteriorates. Accordingly, the control when the vehicle is restarted could deteriorate, and therefore, when the vehicle is restarted, the driver could feel that something is wrong. In order to avoid this malfunction, some techniques have also been disclosed.

Japanese Patent Laying-Open No. 11-193866 discloses a neutral control apparatus for an automatic transmission by which the effect of enhancing fuel economy can be further improved and the driver's feeling that something is wrong can be alleviated. The neutral control apparatus for the automatic transmission sets the automatic transmission in the neutral state when predetermined conditions are satisfied, even if the shift position of the automatic transmission is the forward drive position. The apparatus includes means for determining whether or not predetermined conditions are satisfied, specifically (a) means for determining whether or not the value of the accelerator pedal position is at most a predetermined value, (b) means for determining whether or not the brake pedal is pressed down, (c) means for determining whether or not the timing is shift down timing and (d) means for determining whether or not the value of the vehicle speed is at most a predetermined value. The neutral control apparatus for the automatic transmission further includes means for allowing the automatic transmission to make a transition to the neutral state when all of these determination means determine that respective conditions are satisfied. The neutral control apparatus for the automatic transmission still further includes means for inhibiting the transition to the neutral state when the value of the engine coolant temperature is at most a predetermined value or the automatic transmission hydraulic fluid temperature is at most a predetermined value.

Regarding the neutral control apparatus for the automatic transmission, when the brake pedal is pressed down to gradually decelerate and stop the vehicle, the automatic transmission is changed to the neutral state at the downshift timing immediately before the vehicle is actually stopped, namely the timing of downshift to the first gear. Therefore, as compared with the conventional case where the vehicle is driven over a certain distance in the first gear and then the transition is made to the neutral state when the vehicle is stopped, the effect of enhancing fuel economy is further improved since the transition to the neutral state is made earlier. Further, the downshift to the first gear immediately before the vehicle is stopped causes unnecessary shift shock to the driver and further, the transition from the first gear to the neutral state after the vehicle becomes stationary causes the driver to feel that something is wrong. In contrast, the apparatus of the invention does not make a transition to the neutral state while the vehicle is stationary, but makes a transition to the neutral state at the downshift timing before the vehicle becomes stationary. Therefore, even slight shock to the driver can be alleviated. Further, as conditions for making a transition to the neutral state may additionally include the hydraulic fluid temperature and the coolant temperature, and accordingly further stable control can be implemented.

When this neutral control is not performed while the vehicle is temporarily stopped in the forward drive position (D position), the driving force from the idling engine is transmitted via the torque converter to the automatic transmission. The automatic transmission is in the state where the frictional engagement element implements the first gear for example since the shift position is the D position. In this state, the vehicle is stopped by the brake. Therefore, while a pump impeller on the input side (engine side) of the torque converter is rotated, a turbine impeller on the output side (automatic transmission side) of the torque converter is not rotated.

However, when the automatic transmission hydraulic fluid has a low temperature, the oil level in the oil pan is lower and accordingly the hydraulic fluid containing air bubbles is supplied to the inside of the automatic transmission. In this state, if the neutral control is not performed while the vehicle is stooped in the D position, the air bubbles stay or accumulate in the torque converter since the turbine impeller of the torque converter is not rotated. The presence of such air bubbles makes ineffective the power transmission ability of the torque converter or the ability is deteriorated, resulting in decrease in driving force when the vehicle is restarted (lost drive phenomenon).

The neutral control apparatus for the automatic transmission disclosed in Japanese Patent Laying-Open No. 11-193866 as described above inhibits the neutral control when the temperature of the hydraulic fluid of the automatic transmission is low. Therefore, the driver more strongly feels that something is wrong when the vehicle is restarted, due to deterioration of the power transmission ability caused by air bubbles.

DISCLOSURE OF THE INVENTION

The present invention has been made for solving the above-described problems, and an object of the invention is to provide a control apparatus and a control method for a vehicle mounted with an automatic transmission, by which decrease of the driving force can be avoided that occurs due to a low temperature of the hydraulic fluid of the torque converter.

According to the present invention, a control apparatus controls a vehicle mounted with an automatic transmission having a transmission mechanism including a frictional engagement element that engages when the vehicle is started and having a fluid coupling provided on a drive source side of the transmission mechanism. The control apparatus includes: a detection unit detecting temperature of a hydraulic fluid of the automatic transmission; a determination unit determining, based on the temperature of the hydraulic fluid, whether to reduce a power transmission ability of the fluid coupling; and a control unit controlling the transmission mechanism so that a transition is made to a neutral state in which the frictional engagement element that engages when the vehicle is started has a reduced engagement pressure, in a case where shift position is drive position, the vehicle is in a stopped state and a condition to reduce the power transmission ability of the fluid coupling is satisfied.

In accordance with the present invention, a transition is made to the neutral state when it is determined, based on the temperature of the hydraulic fluid of the automatic transmission, to reduce the power transmission ability of the fluid coupling (such as torque converter), although the neutral control is not usually executed when the hydraulic fluid of the automatic transmission has a low temperature since the response of the frictional engagement element cannot be ensured. When the transition is made to the neutral state, the turbine impeller of the torque converter is rotated (unless the transition to the neutral state is made, the turbine impeller of the torque converter is not rotated). Thus, even if the hydraulic fluid temperature is low and the oil pan level is low to cause air bubbles to be generated in the automatic transmission, the turbine impeller of the torque converter can be rotated to prevent the air bubbles from remaining and accumulating in the torque converter. Therefore, the lost drive phenomenon can be avoided that is the phenomenon where the power transmission ability of the torque converter is disabled or reduced to cause the driving force to decrease when the vehicle is restarted. In this way, the control apparatus and the control method for a vehicle mounted with an automatic transmission can be provided by which the decrease of the driving force due to a low temperature of the hydraulic fluid of the torque converter can be avoided.

Preferably, the determination unit determines whether or not the temperature of the hydraulic fluid is at most a temperature relevant to the condition to reduce the power transmission ability of the fluid coupling.

In accordance with the present invention, the possibility of occurrence of the lost drive phenomenon where the driving force decreases due to air bubbles remaining and accumulating in the torque converter which is an example of the fluid coupling can be accurately determined, based on whether or not the hydraulic fluid of the automatic transmission has a temperature relevant to the condition to reduce the power transmission ability of the fluid coupling.

Still preferably, the determination unit determines whether or not the temperature of the hydraulic fluid is, for at least a predetermined time, continuously at most a temperature relevant to the condition to reduce the power transmission ability of the fluid coupling.

In accordance with the present invention, the possibility of occurrence of the lost drive phenomenon where the driving force decreases due to air bubbles remaining and accumulating in the torque converter which is an example of the fluid coupling can be accurately determined, based on whether or not the state continues where the hydraulic fluid of the automatic transmission has a temperature relevant to the condition to reduce the power transmission ability of the fluid coupling.

Still preferably, the control unit controls the transmission mechanism so that a non-neutral state in which the frictional engagement element engages is implemented after the transition to the neutral state in which the frictional engagement element that engages when the vehicle is started has a reduced engagement pressure.

In accordance with the present invention, even when the transition is made to the neutral state, the non-neutral state is implemented (for example, the neutral state and the non-neutral state are repeated). In the neutral state, the turbine impeller of the torque converter is rotated to prevent air bubbles from remaining and accumulating in the torque converter. In the non-neutral state, the frictional engagement element to be engaged when the vehicle is started is in the engaged state. Therefore, if a return from the neutral control is made at this time, excellent restart of the vehicle can be achieved even if the hydraulic pressure response is not good due to a low temperature of the hydraulic fluid.

Still preferably, the control unit controls the transmission mechanism so that a period of time for which the non-neutral state is implemented is longer than a period of time for which the neutral state is implemented.

In accordance with the present invention, the non-neutral state is implemented for a longer period of time. Therefore, excellent restart of the vehicle can be achieved even if the hydraulic pressure response is not good due to a low temperature of the hydraulic fluid.

Still preferably, the control apparatus further includes a restriction unit restricting output of the drive source, when a return is made from the neutral state.

In accordance with the present invention, when the hydraulic pressure response is not good due to a low temperature of the hydraulic fluid, it takes a longer time for the frictional engagement element having been disengaged in the neutral state to engage, as compared with the case where the hydraulic fluid is at room temperature. If the output of the drive source is increased while the frictional engagement element is disengaged, the vehicle will be suddenly started simultaneously with the time when the element is engaged. Therefore, when a return is made from the neutral state, the output of the drive source is restricted and accordingly excellent restart of the vehicle can be accomplished.

Still preferably, the drive source is an engine and, when the return is made from the neutral state, the restriction unit restricts opening position of a throttle valve adjusting quantity of intake air to the engine.

In accordance with the present invention, the opening position of the throttle valve is restricted to adjust the quantity of intake air to the engine and thereby restrict the output of the engine. Therefore, even if engagement of the frictional engagement element is delayed due to a low temperature of the hydraulic fluid of the automatic transmission, excellent restart of the vehicle can be accomplished.

Still preferably, when the return is made from the neutral state, the restriction unit changes the opening position of the throttle valve so that the change of the opening position of the throttle valve is smoother than that of accelerator pedal position of the vehicle.

In accordance with the present invention, the opening position of the throttle valve is changed smoothly so that the change of the opening position of the throttle valve is smoother than that of the accelerator pedal position of the vehicle, in order to restrict the output of the engine. Thus, the neutral control is executed when the hydraulic fluid of the automatic transmission has a low temperature and, when the accelerator pedal is pressed down, excellent restart of the vehicle can be accomplished.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 shows an operation table of the automatic transmission.

BEST MODES FOR CARRYING OUT THE INVENTION

Figure 1:
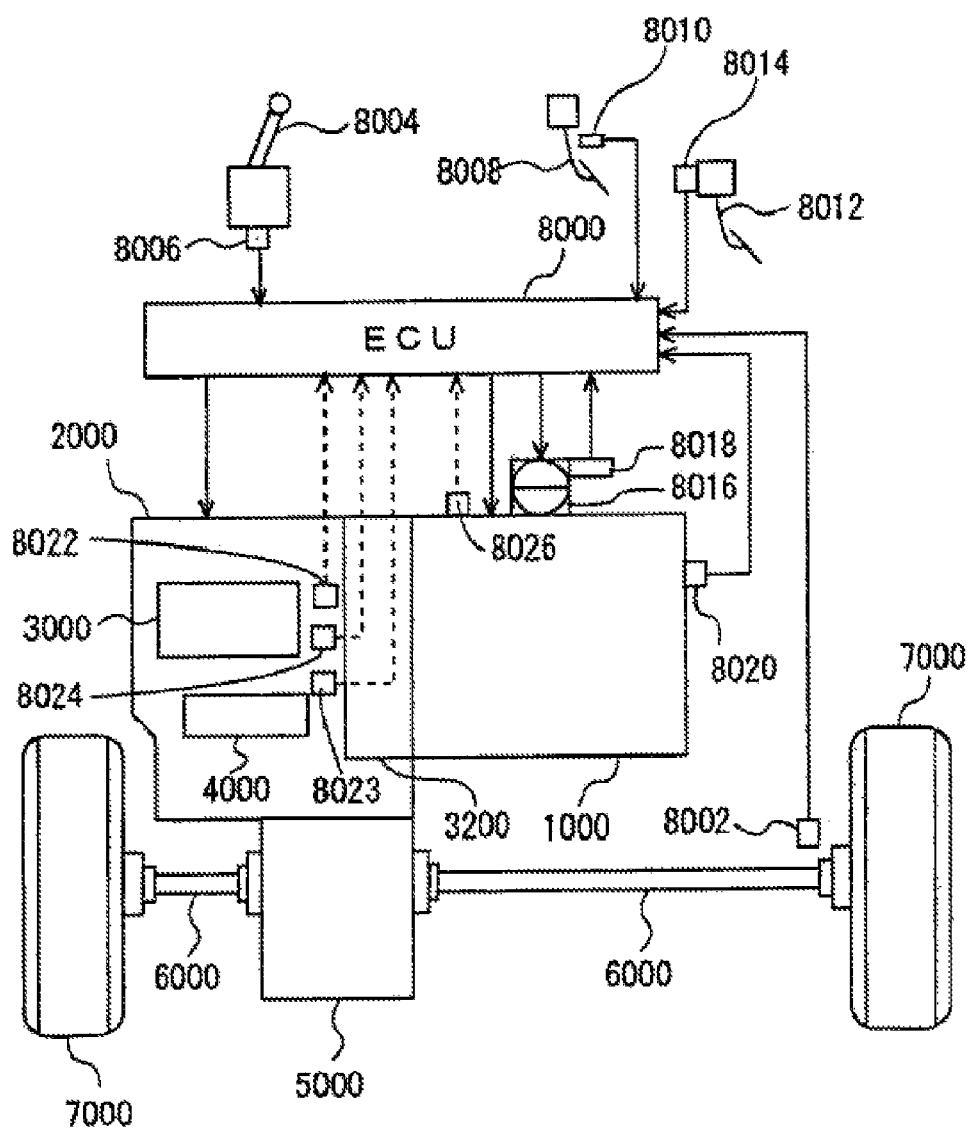
FIG. 1 is a schematic configuration diagram showing a powertrain controlled by an ECU that is a control apparatus according to an embodiment of the present invention.

With reference to the drawings, embodiments of the present invention will be described hereinafter. In the following description, like components are denoted by like reference characters. Their designation and function are also identical. Therefore, a detailed description thereof will not be repeated.

Referring to FIG. 1, a description will be given of a vehicle mounted with a control apparatus according to an embodiment of the present invention. The vehicle is a FF (Front engine Front drive) vehicle mounted with a six-speed automatic transmission. The vehicle may be any vehicle other than the FF vehicle and may be a vehicle mounted with any automatic transmission other than the six-speed automatic transmission. Further, the transmission may be a continuously variable transmission such as a belt-type transmission.

The vehicle includes an engine 1000, a six-speed automatic transmission 2000, a planetary gear unit 3000 (transmission mechanism) constituting a part of automatic transmission 2000, an oil hydraulic circuit 4000 constituting a part of automatic transmission 2000, a differential gear 5000, a driveshaft 6000, a front wheel 7000, and an ECU (Electronic Control Unit) 8000.

Engine 1000 is an internal combustion engine that burns a gas mixture of fuel injected from an injector (not shown) and air, in a combustion chamber of a cylinder. A piston in the cylinder is pushed down by the combustion, whereby a crankshaft is rotated.

Automatic transmission 2000 is coupled via a torque converter 3200 (fluid coupling) to engine 1000. Automatic transmission 2000 converts the revolution speed of the crankshaft to a desired revolution speed for speed change by implementing a desired gear.

Automatic transmission 2000 has an output gear that meshes with differential gear 5000. To differential gear 5000, driveshaft 6000 is coupled by spline-fitting for example. Motive power is transmitted to the left and right front wheels 7000 via driveshaft 6000.

To ECU 8000, a vehicle speed sensor 8002, a position switch 8006 for a shift lever 8004, an accelerator pedal position sensor 8010 for an accelerator pedal 8008, a stroke sensor 8014 for a brake pedal 8012, a throttle opening position sensor 8018 for an electronic throttle valve 8016, an engine speed sensor 8020, an input shaft revolution speed sensor 8022, an output shaft revolution speed sensor 8024, and a coolant temperature sensor 8026 are connected via a harness for example.

Vehicle speed sensor 8002 detects the vehicle speed from the revolution speed of drive shaft 6000, and transmits a signal representing the result of detection to ECU 8000. The position of shift lever 8004 is detected by position switch 8006, and a signal representing the result of detection is transmitted to ECU 8000. A gear of automatic transmission 2000 is automatically implemented according to the position of shift lever 8004.

Accelerator pedal position sensor 8010 detects the position of accelerator pedal 8008, and transmits a signal representing the result of detection to ECU 8000. Stroke sensor 8014 detects the extent of stroke of brake pedal 8012, and transmits a signal representing the result of detection to ECU 8000.

Throttle opening position sensor 8018 detects the opening position of electronic throttle valve 8016 whose opening position is adjusted by an actuator, and transmits a signal representing the result of detection to ECU 8000. By electronic throttle valve 8016, the quantity of air taken into engine 1000 (output of engine 1000) is adjusted.

Engine speed sensor 8020 detects the revolution speed of the output shaft (crankshaft) of engine 1000, and transmits a signal representing the result of detection to ECU 8000. Input shaft revolution speed sensor 8022 detects the revolution speed of the input shaft NI of automatic transmission 2000 (the number of revolutions of the turbine NT of torque converter 3200), and transmits a signal representing the result of detection to ECU 8000. Output shaft revolution speed sensor 8024 detects the revolution speed of the output shaft NO of automatic transmission 2000, and transmits a signal representing the result of detection to ECU 8000.

Coolant temperature sensor 8026 detects the temperature of the coolant (coolant temperature) of engine 1000, and transmits a signal representing the result of detection to ECU 8000.

An automatic transmission hydraulic fluid temperature sensor 8023 detects the temperature of the hydraulic fluid of automatic transmission 2000, and transmits a signal representing the result of detection to ECU 8000.

ECU 8000 controls vehicle's devices such that the vehicle has a desired state (operating state of automatic transmission 2000, particularly neutral control state) based on signals transmitted from vehicle speed sensor 8002, position switch 8006, accelerator pedal position sensor 8010, stroke sensor 8014, throttle opening position sensor 8018, engine speed sensor 8020, input shaft revolution speed sensor 8022, automatic transmission hydraulic fluid temperature sensor 8023, output shaft revolution speed sensor 8024, coolant temperature sensor 8026, for example, as well as a map and a program stored in a ROM (Read-Only Memory).

A gear to be implemented is determined based on a shift map prepared using the vehicle speed and the accelerator pedal position as parameters. For the transmission, a gear to be implemented may be determined based on such a shift map as described above, and additionally a gear may be implemented by upshifting or downshifting according to driver's operation of shift lever 8004.

ECU 8000 which is the control apparatus of the present embodiment has a feature that it executes the neutral control when shift lever 8004 is in the D (drive) position or R (reverse) position and when other conditions for execution of neutral control are satisfied. Here, the conventional apparatus does not perform this neutral control when the hydraulic fluid of automatic transmission 2000 has a low temperature.

Figure 2:
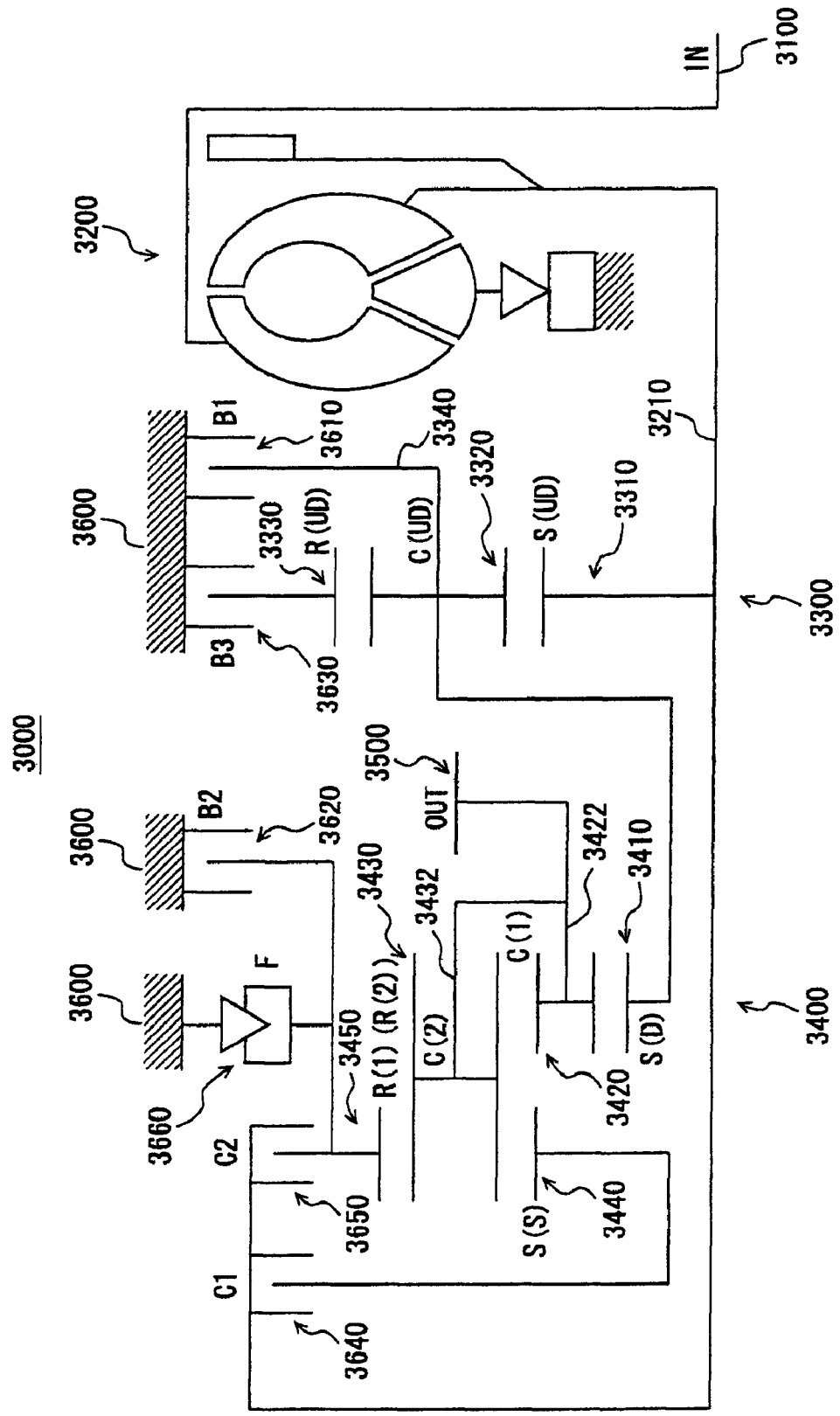
FIG. 2 is a skeletal view showing a geartrain of an automatic transmission.

Referring to FIG. 2, planetary gear unit 3000 will be described. Planetary gear unit 3000 is connected to torque converter 3200 having an input shaft 3100 coupled to the crankshaft. Planetary gear unit 3000 includes a first set of the planetary gear mechanism 3300, a second set of the planetary gear mechanism 3400, an output gear 3500, B1, B2, and B3 brakes 3610, 3620 and 3630 fixed to a gear case 3600, C1 and C2 clutches 3640 and 3650, and a one-way clutch F 3660.

First set 3300 is a single pinion type planetary gear mechanism. First set 3300 includes a sun gear S (UD) 3310, a pinion gear 3320, a ring gear R (UD) 3330, and a carrier C (UD) 3340.

Sun gear S (UD) 3310 is coupled to an output shaft 3210 of torque converter 3200. Pinion gear 3320 is rotatably supported on carrier C (UD) 3340. Pinion gear 3320 engages with sun gear S (UD) 3310 and ring gear R (UD) 3330.

Ring gear R (UD) 3330 is fixed to gear case 3600 by B3 brake 3630. Carrier C (UD) 3340 is fixed to gear case 3600 by B1 brake 3610.

Second set 3400 is a Ravigneaux type planetary gear mechanism. Second set 3400 includes a sun gear S (D) 3410, a short pinion gear 3420, a carrier C (1) 3422, a long pinion gear 3430, a carrier C (2) 3432, a sun gear S (S) 3440, and a ring gear R (1) (R (2)) 3450.

Sun gear S (D) 3410 is coupled to carrier C (UD) 3340. Short pinion gear 3420 is rotatably supported on carrier C (1) 3422. Short pinion gear 3420 engages with sun gear S (D) 3410 and long pinion gear 3430. Carrier C (1) 3422 is coupled with output gear 3500.

Long pinion gear 3430 is rotatably supported on carrier C (2) 3432. Long pinion gear 3430 engages with short pinion gear 3420, sun gear S (S) 3440, and ring gear R (1) (R (2)) 3450. Carrier C (2) 3432 is coupled with output gear 3500.

Sun gear S (S) 3440 is coupled to output shaft 3210 of torque converter 3200 by C1 clutch 3640. Ring gear R (1) (R (2)) 3450 is fixed to gear case 3600 by B2 brake 3620, and coupled to output shaft 3210 of torque converter 3200 by C2 clutch 3650. Ring gear R (1) (R (2)) 3450 is coupled to one-way clutch F 3660, and is disabled in rotation during the drive in the first gear.

One-way clutch F 3660 is provided in parallel with B2 brake 3620. Specifically, one-way clutch F 3660 has the outer race fixed to gear case 3600, and the inner race coupled to ring gear R (1) (R (2)) 3450 via the rotation shaft.

FIG. 3 is an operation table showing the relation between gears to be shifted and operation states of the clutches and brakes. The circular mark represents engagement. The cross mark represents disengagement. The double circular mark represents engagement only during engine braking. The triangular mark represents engagement only during driving. By operating each brake and each clutch based on the combination shown in the operation table, the forward gears including first gear to sixth gear and the reverse gear are implemented.

As seen from the operation table shown in FIG. 3, C1 clutch 3640 always engages in the first gear (1st) or the second gear (2nd) in which the vehicle having been stopped is moved forward in the D position. When the vehicle is moved rearward in the R position, B2 brake 3620 and B3 brake 3630 engage. When the neutral control is executed, ECU 8000 which is the control apparatus of the present embodiment disengages C1 clutch 3640 when in the D position, and disengages B2 brake 3620 and B3 brake 3630 when in the R position. Since planetary gear unit 3000 is configured differently depending on the type of the transmission, the frictional engagement elements (clutches and brakes) that are under neutral control when in the D position and R position are not limited to the above-described ones.

Figure 4:
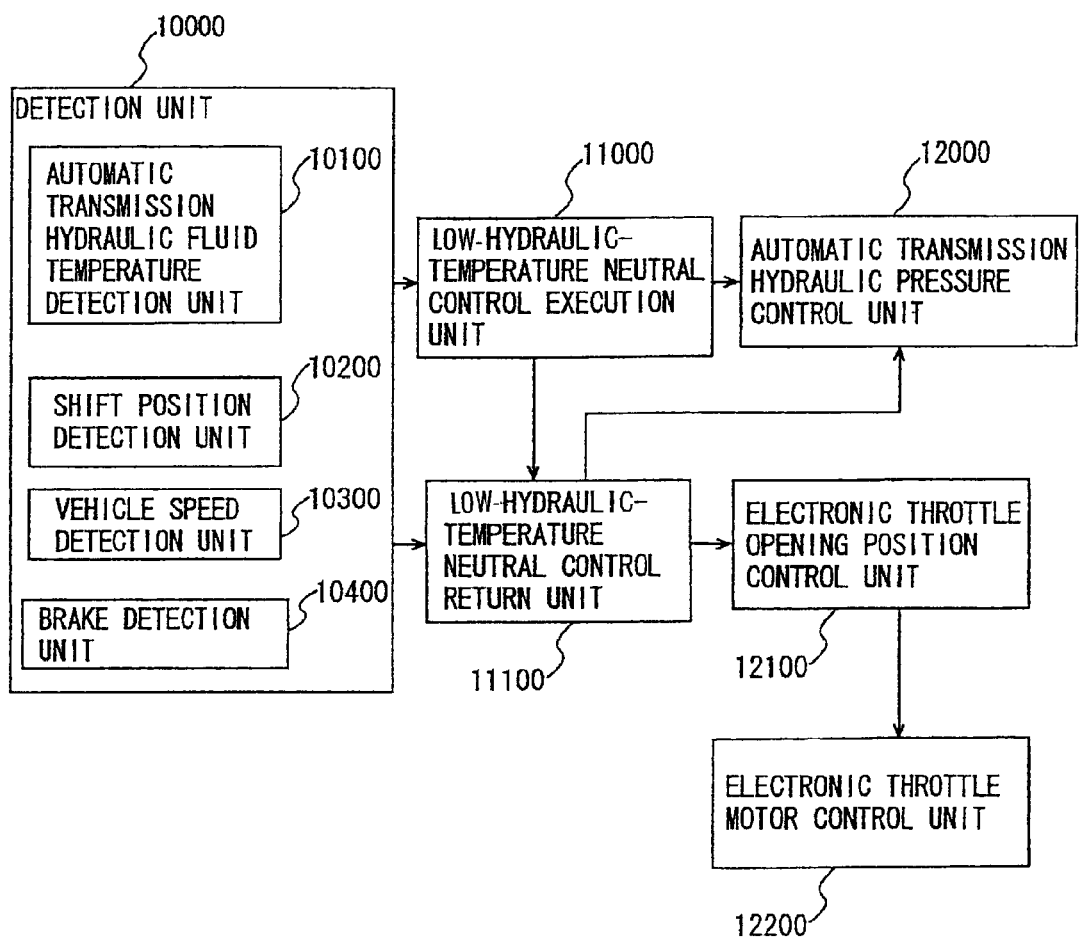
FIG. 4 is a functional block diagram of the control apparatus according to the embodiment of the present invention.

Referring to FIG. 4, a description will be given of a functional block diagram of the control apparatus according to the present embodiment.

As shown in FIG. 4, the control apparatus includes a detection unit 10000 detecting the quantity representing various states each of the vehicle to be controlled, a low-hydraulic-temperature neutral control execution unit 11000 determining, based on the quantity representing various states each of the vehicle to be controlled as detected by detection unit 10000, whether to execute (start) the neutral control or not even if the hydraulic fluid of automatic transmission 2000 has a low temperature, and then allowing the neutral control to be executed if so determined, a low-hydraulic temperature neutral control return unit 11100 determining, after the neutral control is executed (started), whether to return from the neutral control or not (whether to end the neutral control and start normal control) based on the quantity representing various states each of the vehicle to be controlled as detected by detection unit 10000, and returning from the neutral control if so determined, and an automatic transmission hydraulic pressure control unit 12000 controlling hydraulic pressure circuit 4000 of automatic transmission 2000 to execute the neutral control by disengaging C1 clutch 3640 for example of planetary gear unit 3000, or return from the neutral control by engaging the disengaged C1 clutch 3640 for example.

The control apparatus executes the neutral control even when the temperature of the hydraulic fluid of automatic transmission 2000, which does not have good hydraulic pressure response, is low. Therefore, when returning from the neutral control, the time taken by the disengaged C1 clutch 3640 to engage is longer when the temperature of the hydraulic fluid is low than that when the temperature thereof is high. Thus, in consideration of this response delay, (smoothing)

control is performed in order to prevent electronic throttle valve 8016 from being opened widely even if the driver steps on accelerator pedal 8008. Otherwise, since C1 clutch 3640 having been disengaged is engaged after the speed of engine 1000 increases, the vehicle could be started suddenly. The control apparatus can avoid such a sudden start. Therefore, the control apparatus includes an electronic throttle opening position control unit 12100 connected to low-hydraulic-temperature neutral control return unit 11100 for performing the smoothing control of the opening position of electronic throttle valve 8016 when returning from the neutral control, and an electronic throttle motor control unit 12200 connected to electronic throttle opening position control unit 12100.

Detection unit 10000 includes an automatic transmission hydraulic fluid temperature detection unit 10100 detecting the temperature of the hydraulic fluid of the automatic transmission (corresponding to automatic transmission hydraulic fluid temperature sensor 8023), a shift position detection unit 10200, a vehicle speed detection unit 10300, and a brake detection unit 10400. Based on respective values obtained by the detection, a determination is made as to whether to execute the neutral control or not or whether to return from the neutral control or not.

The control apparatus of the present embodiment having the functional blocks as described above can be implemented by hardware mainly configured with digital circuits and analog circuits or software mainly configured with a CPU (Central Processing Unit) and a memory that are included in ECU 8000 and a program read from the memory and executed by the CPU. It is generally said that the apparatus implemented by hardware is advantageous in terms of the operating speed and the apparatus implemented by software is advantageous in terms of design change. In the following, a control apparatus implemented as software will be described.

Figure 5:
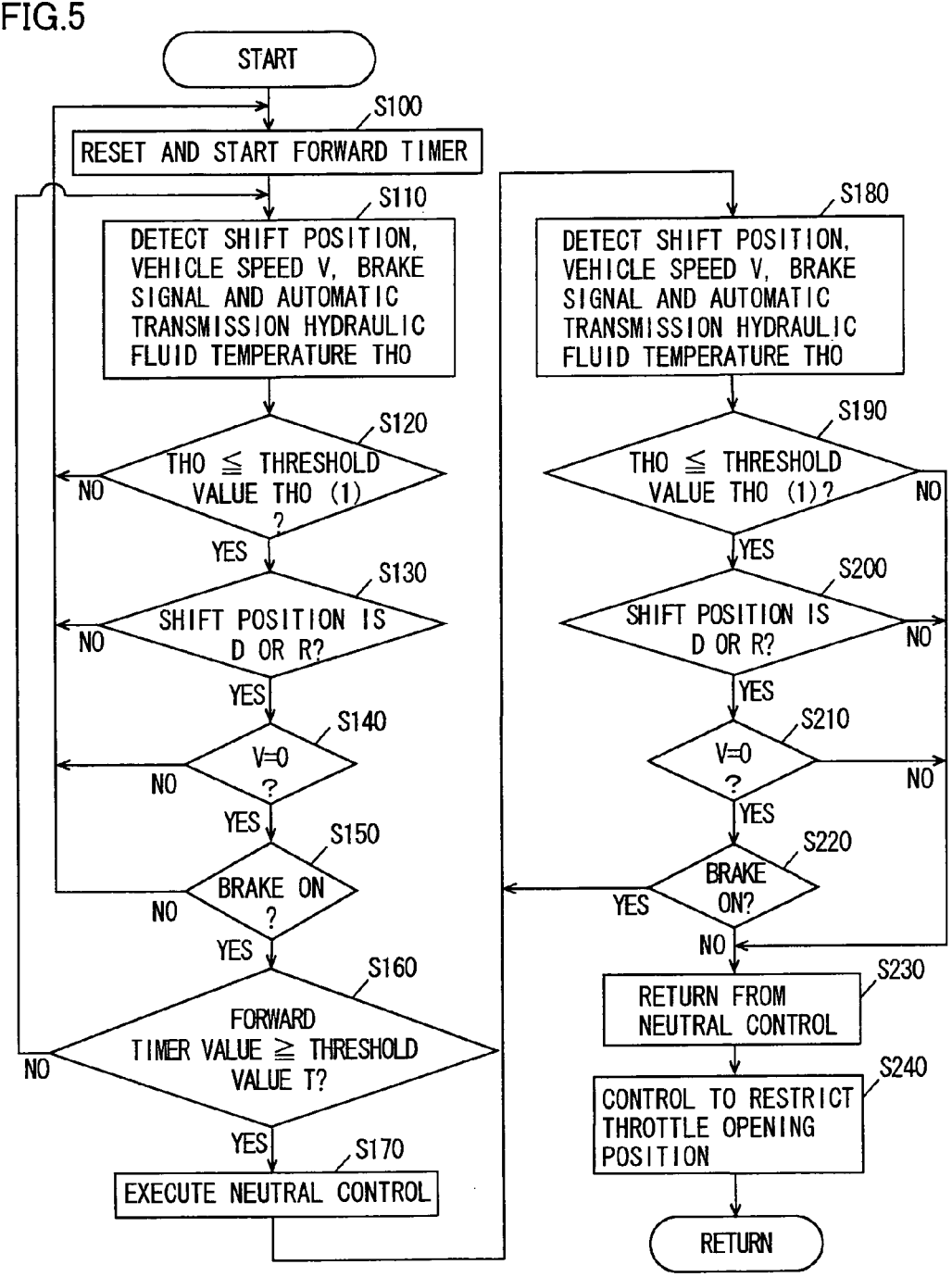
FIG. 5 is a flowchart showing a control structure of a program executed by the ECU that is the control apparatus according to the embodiment of the present invention.

Referring to FIG. 5, a description will be given of a control structure of a program executed by ECU 8000 which is the control apparatus of the present embodiment. This program is repeatedly executed with a predetermined cycle time.

In step (hereinafter step is abbreviated as S) 100, ECU 8000 resets and starts a forward timer.

In S110, ECU 8000 detects the shift position, vehicle speed V, brake signal, and automatic transmission hydraulic fluid temperature THO. The shift position is detected based on a signal supplied from position switch 8006, the vehicle speed is detected based on a signal supplied from output shaft revolution speed sensor 8024, the brake signal is detected based on a signal supplied from stroke sensor 8014 for brake pedal 8012, and automatic transmission hydraulic fluid temperature THO is detected based on a signal supplied from automatic transmission hydraulic fluid temperature sensor 8023

In S120, ECU 8000 determines whether or not the detected automatic transmission hydraulic fluid temperature THO is at most a threshold value THO (1). Threshold value THO (1) is set to a temperature (0° C. for example) at which the hydraulic fluid containing air bubbles is supplied into the automatic transmission since the oil level of the oil pan becomes lower. When the detected automatic transmission hydraulic fluid temperature THO is equal to or lower than threshold value THO (1) (YES in S120), the process proceeds to S130. Otherwise (NO in S120), the process returns to S100.

In S130, ECU 8000 determines whether the detected shift position is the D position or R position. When the detected shift position is the D position or R position (YES in S130), the process proceeds to S140. Otherwise (NO in S130), the process returns to S100.

In S140, ECU 8000 determines whether or not the detected vehicle speed V is zero (or may be close to zero). When the detected vehicle speed V is zero (YES in S140), the process proceeds to S150. Otherwise (NO in S140), the process returns to S100.

In S150, ECU 8000 determines whether or not the brake is operating (brake is ON) according to stroke sensor 8014 for brake pedal 8012 as detected. When the brake is operating (YES in S150), the process proceeds to S160. Otherwise (NO in S150), the process returns to S100. Whether or not the brake is operating may be determined based on the pressure of a brake master cylinder.

In S160, ECU 8000 determines whether or not the indicated value of the forward timer reaches at least a threshold value T. Threshold value T is set to a time (30 seconds for example) for which the hydraulic fluid containing air bubbles is supplied into the automatic transmission and particularly air bubbles remain or accumulate within torque converter 3200 due to low hydraulic fluid temperature THO of automatic transmission 2000 and a resultant decrease of the oil level in the oil pan. When it is determined that the value of the forward timer is equal to or larger than threshold value T (YES in S160), the process proceeds to S170. Otherwise (NO in S160), the process returns to S110 and, as long as the conditions of S120 to S150 are satisfied, the forward timer is counted. The lost drive phenomenon can more surely be avoided by setting threshold value T to zero second.

In S170, ECU 8000 executes the neutral control. When in the D position, C1 clutch 3640 having been engaged is disengaged. When in the R position, B2 brake 3620 and B3 brake 3630 having been engaged are disengaged.

In S180, ECU 8000 detects the shift position, vehicle speed V, brake signal, and automatic transmission hydraulic fluid temperature THO while executing the neutral control. Although this process step differs in timing from the process step in S110 since the former step is performed during the neutral control, these process steps are identical to each other.

In S190, ECU 8000 determines whether or not the detected automatic transmission hydraulic fluid temperature THO is at most threshold value THO (1). Although this process step is different in timing from the process step of S120 since the former step is performed during the neutral control and these process steps are different in terms of the subsequent process performed based on the result of this determination, they are similar process steps. When the detected automatic transmission hydraulic fluid temperature THO is equal to or lower than threshold value THO (1) (YES in S190), the process proceeds to S200. Otherwise (NO in S190), the process proceeds to S230.

In S200, ECU 8000 determines whether the detected shift position is the D position or R position. Although this process step is also different in timing from the process step of S130 since the former step is performed while the neutral control is executed and these process steps are different in terms of the subsequent process performed based on the result of this determination, they are similar process steps. When the detected shift position is the D position or R position (YES in S200), the process proceeds to S210. Otherwise (NO in S200), the process proceeds to S230.

In S210, ECU 8000 determines whether or not the detected vehicle speed V is zero (or may be close to zero). Although this process step is also different in timing from the process step of S140 since the former step is performed while the neutral control is executed and these process steps are different in terms of the subsequent process performed based on the result of this determination, they are similar process steps. When the detected vehicle speed V is zero (YES in S210), the process proceeds to S220. Otherwise (NO in S210), the process proceeds to S230.

In S220, ECU 8000 determines whether or not the brake is operating (brake is ON) according to stroke sensor 8014 for brake pedal 8012 as detected. Although this process step is also different in timing from process step of S150 since the former step is performed while the neutral control is executed and the process steps are different in terms of the subsequent process performed based on the result of this determination, they are similar process steps. When the brake is operating (YES in S220), the process returns to S180. Otherwise (NO in S220), the process proceeds to S230.

In S230, ECU 8000 returns the control from the neutral control. At this time, the frictional engagement element (clutch or brake) disengaged in S170 is engaged.

In S240, ECU 8000 restricts the opening position of electronic throttle valve 8016. At this time, based on the pedal position of accelerator pedal 8008 as detected by accelerator pedal position sensor 8010, the opening position of electronic throttle valve 8016 is determined. Here, the opening position of electronic throttle valve 8016 is changed while restricted so that the change of the opening position of the electronic throttle valve is smoother than that of the pedal position of accelerator pedal 8008. The opening position of electronic throttle valve 8016 may be restricted so that the value representing the opening position of electronic throttle value 8016 is not equal to or larger than a certain value.

While S120 to S150 of the flowchart in FIG. 5 are conditions for execution of the neutral control and S190 to S220 are conditions for return from the neutral control, other conditions for execution of the neutral control and other conditions for return from the neutral control may be used.

A description will be given of operation of a vehicle controlled by the control apparatus of the present embodiment based on the above-described structure and flowchart. In the following, the neutral control when in the D position is described since the neutral control in the R position is the same as that in the D position.

Regarding this vehicle, when for example the vehicle temporarily stops at a red light at an intersection or temporarily stops due to a traffic jam and additionally other conditions are satisfied, the neutral control is performed by disengaging C1 clutch 3640 (namely while the shift position is the D position, planetary gear unit 3000 is in the neutral state). For such a vehicle, the shift position, vehicle speed V, brake signal and hydraulic fluid temperature THO of automatic transmission 2000 are detected at an appropriate timing (S110).

The forward timer counts the time as long as the following conditions are continuously satisfied: the neutral control is not executed; temperature THO of the hydraulic fluid of automatic transmission 2000 is at most threshold value THO (1) (YES in S120); the shift position is the D position (YES in S130); vehicle speed V is zero (YES in S140); and the brake is ON (YES in S150).

The neutral control is executed when the conditions: temperature THO of the hydraulic fluid of automatic transmission 2000 is at most threshold value THO (1); the shift position is the D position; vehicle speed V is zero; and the brake is ON, are continuously satisfied for a period of time indicated by threshold value T (30 seconds for example) (YES in S160). At this time, temperature THO of the hydraulic fluid of automatic transmission 2000 is at most threshold value THO (1).

While the neutral control is executed, the shift position, vehicle speed V, brake signal and temperature THO of the hydraulic fluid of automatic transmission 2000 are detected at an appropriate timing (S180). As long as the following conditions: temperature THO of the hydraulic fluid of automatic transmission 2000 is at most threshold value THO (1) (YES in S190); the shift position is the D position (YES in S200);

vehicle speed V is zero (YES in S210); and the brake is ON (YES in S220), are continuously satisfied, the neutral control is continued. At this time, temperature THO of the hydraulic fluid of automatic transmission 2000 is at most threshold value THO (1), and the oil level in the oil pan for the hydraulic fluid of automatic transmission 2000 is low. Therefore, the hydraulic fluid containing air bubbles is undesirably supplied into automatic transmission 2000 (including torque converter 3200). Further, the neutral control is not performed for at least the period of time represented by threshold value T and the vehicle is stopped in the D position. Therefore, the state continues where the pump impeller on the input side (engine side) of torque converter 3200 is rotated while the turbine impeller on the output side (automatic-transmission side) of torque converter 3200 is not rotated. Thus, air bubbles remain and accumulate in torque converter 3200.

In such a state, the lost drive phenomenon undesirably occurs when the control returns from the neutral control, so that torque converter 3200 cannot transmit the driving force of engine 1000. Therefore, in order to avoid this state, the neutral control is executed. When the neutral control is executed to disengage C1 clutch 3640, the pump impeller as well as the turbine impeller of torque converter 3200 are both rotated. Accordingly, the air bubbles remaining and accumulating in torque converter 3200 flow to anywhere other than torque converter 3200 of automatic transmission 2000. In this way, the state where air bubbles remain and accumulate in torque converter 3200 can be eliminated.

In contrast, when the following conditions: temperature THO of the hydraulic fluid of automatic transmission 2000 is not at most threshold value THO (1) (NO in S190), the shift position is not the D position (NO in S200), vehicle speed V is not zero (NO in S210), and the brake is not ON (NO in S220), are satisfied, the control returns from the neutral control (S230).

In this case, supposing that an engagement instruction signal for instructing C1 clutch 3640 to engage is output to the C1 clutch. However, the temperature of the hydraulic fluid of automatic transmission 2000 is low and the hydraulic pressure response is not good. Therefore, it takes a longer time for C1 clutch 3640 to engage (as compared with the case where the hydraulic fluid has a higher temperature). Accordingly, the process of restricting the throttle opening position (smoothing process) is performed for preventing electronic throttle valve 8016 from being widely opened even if accelerator pedal 8008 is pressed down, and thereby preventing increase of the speed of engine 1000 (S240).

Thus, when C1 clutch 3640 disengages or half-engages, the speed of engine 1000 does not suddenly increase. Further, since the speed (and thus the torque) of engine 1000 increases after C1 clutch 3640 engages, a sudden start of the vehicle (driver feels that the vehicle starts moving suddenly) can be prevented when the control returns from the neutral control while the hydraulic fluid of the automatic transmission has a low temperature.

In this way, with the control apparatus of the present embodiment, the lost drive phenomenon can be avoided that occurs under the conventional control that does not perform the neutral control when the hydraulic fluid of the automatic transmission has a low temperature. The lost drive phenomenon occurs when the turbine impeller of the torque converter does not rotate and air bubbles stay and accumulate in the torque converter. Further, in consideration of the fact that the hydraulic fluid of the automatic transmission has a low temperature and the hydraulic pressure response of the frictional engagement element is not good, the opening position of the electronic throttle valve is restricted when the control returns from the neutral control. In this way, an increase of the engine speed when the element does not engage can be suppressed, thereby avoiding a sudden start of the vehicle when the control returns from the neutral control.

In the following, modifications of the above-described embodiment are illustrated.

FIRST MODIFICATION

In the flowchart of FIG. 5, in the period from the start of execution of the neutral control (S170) to the return from the neutral control (S230), the state where the neutral control is executed (C1 clutch 3640 disengages) and the state where the neutral control is not executed (C1 clutch 3640 engages) may be repeated at certain time intervals.

In particular, to the extent that does not allow air bubbles to stay and accumulate in torque converter 3200, the state where the neutral control is not executed (C1 clutch 3640 engages and the turbine impeller of torque converter 3200 is stopped) may be continued long. Then, at the timing when the driver makes the brake off to start the vehicle, the state where C1 clutch 3640 engages is relatively longer in time, so that the vehicle can be started speedily. Further, the process of restricting the opening position of electronic throttle valve 8016 (smoothing process) may be dispensed with.

SECOND MODIFICATION

In S160 of the flowchart of FIG. 5, threshold value T may be variable depending on temperature THO of the hydraulic fluid of automatic transmission 2000, since the time taken to cause the lost drive phenomenon is different between the case where temperature THO of the hydraulic fluid of automatic transmission 2000 is −10° C. and the case where temperature THO thereof is −30° C.

For example, as temperature THO of the hydraulic fluid of automatic transmission 2000 is lower, threshold value T may be set smaller.

THIRD MODIFICATION

In S160 of the flowchart of FIG. 5, instead of the condition where the vehicle state continuously satisfies predetermined conditions (S120 to S150) for at least a period of time indicated by threshold value T, the condition that the engine torque or estimated engine torque is at most a predetermined value may be used. In other words, the conditions for execution of the neutral control that is performed for avoiding the lost drive at low temperature are changed.

When the lost drive phenomenon occurs, the power transmission ability of torque converter 3200 is deteriorated. In other words, the load of engine 1000 is decreased. Therefore, as compared with the case where the lost drive phenomenon does not occur, the output torque of engine 1000 is lower.

Here, the output torque of the engine (input torque to the automatic transmission) decreases. Therefore, based on the fact that the engine torque or estimated engine torque is at most a predetermined value, the neutral control can be executed to rotate the turbine impeller of torque converter 3200, and thereby avoid the lost drive phenomenon.

FOURTH MODIFICATION

In S160 of the flowchart of FIG. 5, the condition that the vehicle state satisfies predetermined conditions (S120 to S150) continuously for at least a period of time indicated by threshold value T, may be changed to the condition that the engine speed is at least a predetermined value. In other words, the conditions for execution of the neutral control performed for avoiding the lost drive at low temperature are changed.

The engine is controlled so that the quantity of intake air and the quantity of injected fuel for example are constant during idle operation. Regarding such an engine, when the actual engine speed is higher than the engine speed estimated based on the intake air quantity for example (since the power transmission ability of torque converter 3200 deteriorates to cause load of engine 1000 to decrease and cause the actual engine speed to increase), it can be predicted that there is a high possibility of occurrence of the lost drive phenomenon. Therefore, based on the fact that the engine speed is at least a predetermined value, the neutral control is executed to rotate the turbine impeller of torque converter 3200. In this way, the lost drive phenomenon can be avoided.

Although the present invention has been described and illustrated in detail, it is clearly understood that the same is by way of illustration and example only and is not to be taken by way of limitation, the scope of the present invention being limited only by the terms of the appended claims.

The invention claimed is:

1. A control apparatus for a vehicle mounted with an automatic transmission having a transmission mechanism including a frictional engagement element that engages when the vehicle is started and having a fluid coupling provided on a drive source side of said transmission mechanism, said control apparatus comprising:

a detection unit detecting temperature of a hydraulic fluid of said automatic transmission;

a determination unit determining, based on the temperature of said hydraulic fluid, whether to reduce a power transmission ability of said fluid coupling; and a control unit programmed to control said transmission mechanism so that a transition is made to a neutral state in which the frictional engagement element that engages when said vehicle is started has a reduced engagement pressure, in a case where shift position is drive position, the vehicle is in a stopped state and a condition to reduce the power transmission ability of said fluid coupling is satisfied, wherein said determination unit determines whether or not the temperature of said hydraulic fluid is at most a temperature relevant to the condition to reduce the power transmission ability of said fluid coupling, wherein the control unit restricts output of said drive source, when a return is made from said neutral state, and wherein said drive source is an engine, and when the return is made from said neutral state, said control unit restricts opening position of an electronic throttle valve adjusting quantity of intake air to said engine.

\* \* \* \* \*